UNITED STATES PATENT OFFICE

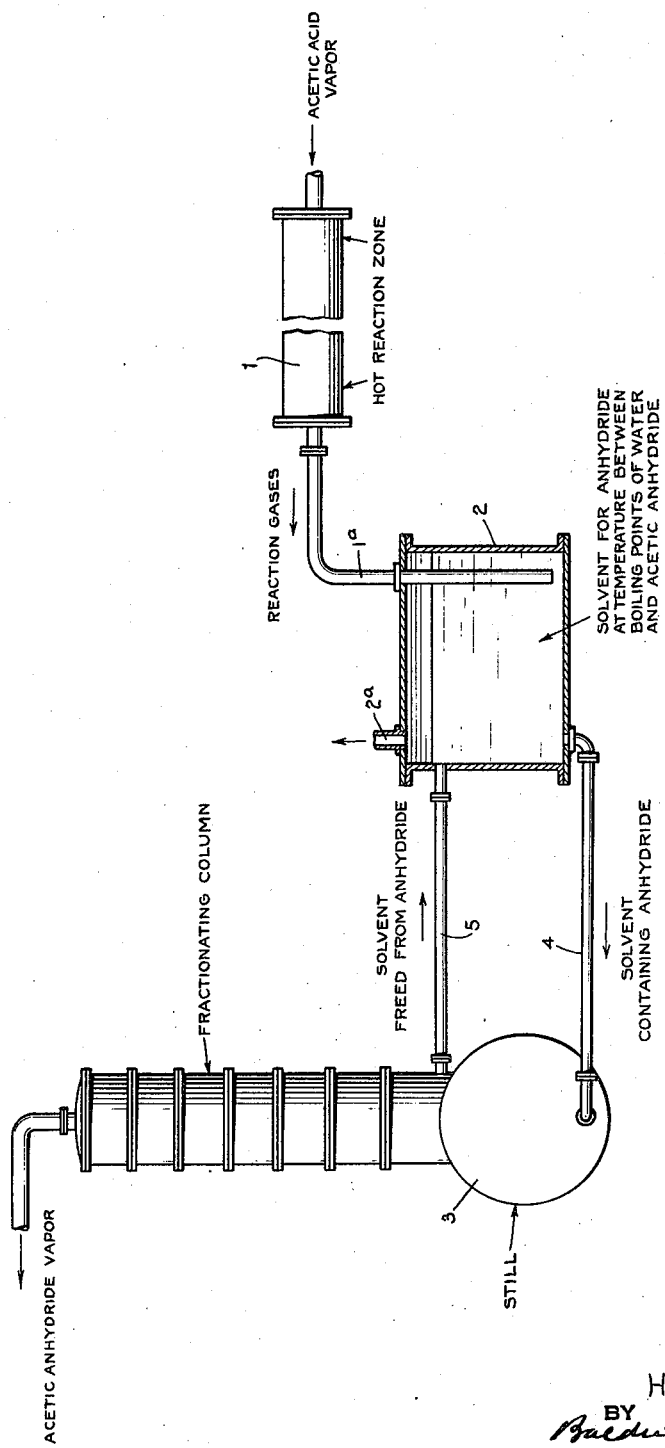

HENRY DREYFUS, OF LONDON, ENGLAND

MANUFACTURE OF AN ALIPHATIC COMPOUND

Application filed January 19, 1927, Serial No. 162,217, and in Great Britain June 1, 1926.

This invention relates to the manufacture of aliphatic anhydrides from aliphatic acids and especially to the manufacture of acetic anhydride from acetic acid, and the object especially is to provide a process for the manufacture of acetic anhydride from dilute acetic acid and also to provide an improvement in the process for making acetic anhydride from glacial acetic acid.

It was shown by Peytral (Bulletin de la Société Chimique de France XXXI pages 113–118) that acetic anhydride can be produced by passing glacial acid vapours through metallic tubes heated to about 900 to 1100° C. In this process a yield of about 2% of acetic anhydride was obtained, and the quantity of decomposition products formed such as gases, as given by Peytral was very small or unsubstantial, most of the vapours from the reaction being recovered as acetic acid on condensation.

In view of the well known high combining power of acetic anhydride and water, which are produced on the pyrogenic decomposition of acetic acid, it may be supposed that a lot more acetic anhydride may have been formed, but that, on condensing the vapours to collect the yield, a quantity of the acetic anhydride may have recombined with the water to form acetic acid.

Later it has been suggested that the formation of acetic anhydride by the pyrogenic decomposition of acetic acid can be performed by using certain catalysts, which in particular are such as have no power to produce decomposition products such as acetone, or by avoiding metals as contact materials, or by avoiding very high temperatures, and the processes based on these suggestions claim increased yields of acetic anhydride.

I have now found that acetic anhydride vapour will not combine with dry steam (especially superheated steam in which case any chance of condensation of water is avoided) provided that no condensation of the steam is allowed to take place, and that the anhydride may be condensed or separated from such mixtures before the steam can condense to water provided that such condensation or separation is effected without permitting the water vapour to condense; for this purpose therefore "superheated" steam (i. e. dry water vapour in the vapourous or gaseous state at temperatures above those at which condensation of the water vapour can take place) is used so that condensation of the water vapour is avoided as much as possible. It is of course understood that if small amounts of water vapour do condense in such mixtures that it will be at the expense of the acetic anhydride which will be hydrolyzed in a degree corresponding with the amount of water vapour condensed.

I have further found that the formation of acetic anhydride from acetic acid takes place to a very substantial degree or even practically quantitatively at elevated, high or very high temperatures and that the acetic anhydride so produced does not tend to reform acetic acid so long as the water vapour present or produced by the reaction is kept in vapour or gaseous form, and that the acetic anhydride may be condensed and separated without hydrolyzation (or substantial hydrolyzation) to acetic acid so long as water is maintained as far as possible in gaseous or vapour form. The higher above the boiling point of water that the temperature is at which the condensation of the anhydride is effected, the easier may the separation of the anhydride be effected.

I have further made the surprising discovery that dilute acetic acid may be converted by pyrogenic decomposition to acetic anhydride and that the acetic anhydride so produced may similarly be separated if condensation of the water vapour or water in the gaseous form is avoided; and it thus is established that acetic anhydride can exist in admixture with water vapour if condensation of the water vapour is avoided and that acetic anhydride is formed from acetic acid substantially quantitatively at high temperatures.

According to the present invention therefore, I subject the vapours of acetic acid (in which term I include dilute as well as glacial acetic acid) to pyrogenic decomposition at high or moderately high temperatures in presence or absence of catalysts (the presence of catalysts is not however necesary as equally good results may be obtained in their absence) and subject the gases or vapours on leaving the hot reaction zone to fractional condensation i. e. by effecting the condensation of the acetic anhydride at temperatures at which the water remains in gaseous or vapour form, whereby the acetic anhydride may be condensed and the water may be allowed to escape in gaseous or vapour form.

While the fractional condensation may be effected so as to condense all the acetic anhydride and permit the water to escape in gaseous or vapour form, it is of course understood that I may treat the escaping water vapour to recover acetic acid or any acetic anhydride which may remain therein, for instance I may subject the water vapour to condensation and fractional distillation or the vapour may be subjected again to pyrogenic decomposition to form further quantities of acetic anhydride.

The fractional condensation may be effected by leading the hot reaction gases through apparatus for fractional condensation, for instance, upwards through one or more fractionating columns, maintained at temperatures intermediate between the boiling points of acetic anhydride and of water under the conditions of pressure obtaining, whereby the acetic anhydride may be condensed without condensation (or substantial condensation) of the water vapour.

The process of the present invention may however, be still more advantageously performed by effecting the fractional condensation in presence of liquids (which are preferably solvents for acetic anhydride) which have boiling points higher than that of water and preferably higher or even very much higher than that of acetic anhydride. The higher the boiling point of the liquids or solvents the better can the separation of the anhydride be effected. Further, the solvents employed should be preferably substantially insoluble in water and nonvolatile in steam though I do not limit myself in this respect as I may employ solvents of the character indicated but which are soluble in water or volatile in steam.

Examples of the solvents of the character hereinbefore indicated which I may employ are chlorbenzol, dichlorbenzol, benzylether, tetrachlorethane, paraffin oil, acetyl glycerins e. g. triacetin, phenetol, anisol, cresol, acetylated cresol, but it is of course understood that I may employ any other liquids or solvents having the aforementioned properties and especially liquids of the character referred to having boiling points considerably higher than that of acetic anhydride e. g. 135 to 200° C. or more and preferably 200 to 300° C. or more.

In performing the process of the present invention with the aid of such liquids or solvents, I may for example pass the hot reaction gases through or otherwise in contact with dichlorbenzol, benzyl ether, anisol, phenetol, cresol, acetylated cresol, paraffin oil, or other solvents of the character referred to maintained at a temperature higher than the boiling point of water and preferably at a temperature intermediate between the boiling points of water and of acetic anhydride under the conditions obtaining (i. e. as modified by the pressure and by admixture of the acetic anhydride and the solvent or liquid employed) whereby the acetic anhydride is absorbed by said liquids or solvents and the water escapes in gaseous or vapour form.

It will be understood that a mixture of acetic anhydride and solvent will be produced in which the boiling point of the acetic anhydride may be considerably altered and is in fact generally raised by the high boiling solvents; thus the absorption or separation of the acetic anhydride from the gases or vapours can be effected at temperatures even higher than the normal boiling point of acetic anhydride. However, due consideration has to be given to the fact that some solvents may be capable of yielding constant boiling point mixtures with acetic anhydride.

The solvents used for absorbing the acetic anhydride may be treated in any suitable way for recovering the absorbed acetic anhydride. Thus for example, they may be heated to drive off the acetic anhydride or subjected to fractional distillation after being removed from the apparatus. Preferably however, I effect the recovery of the acetic anhydride by combining the recovery with the absorption, by circulating the liquids or solvents from the absorption zone through apparatus heated to a higher temperature whereby the acetic anhydride may be partially or entirely separated or distilled off from the liquids or solvents, and then return the said liquids or solvents to the absorption zone thus maintaining a continuous circulation of the absorbing liquid or liquids and continuous recovery of acetic anhydride.

The solvents may, instead of being used in liquid form for absorbing the acetic anhydride be mixed in vapour form with the hot reaction gases or vapours and the resulting mixture be subjected to condensation at temperatures above the boiling point of water whereby the acetic anhydride and solvent can be condensed without condensation of the water vapour.

The pyrogenic decomposition of the acetic acid vapours to form the hot reaction gases or vapours may be performed in any suitable manner, in presence or absence of any known catalysts and under any desired pressure or under reduced pressure or "vacuum."

The pyrogenic decomposition may be performed at temperatures of between about 200° and 1200° C. and is especially active when the temperature is relatively high for instance at about 700° to 1000° C. With the higher temperature it is preferable to have increased speed of passage of the vapours, in fact by regulating the speed of passage of the vapours the formation of decomposition products can be avoided. Further the pyrogenic decomposition may be performed in tubes or other form of apparatus forming the hot reaction zone. Such tubes or other form of apparatus may be made of any suitable material, copper being especially suitable for the purpose, and where high temperatures are employed earthenware, iron or like apparatus may with advantage be used.

It is to be understood that I do not limit myself to the concentration of acetic acid to be employed as the present invention enables re-acetic anhydride to be produced from acetic acids of all concentrations whether dilute or concentrated or glacial; it also affords valuable means for recovering waste or industrial dilute acetic acids in the form of acetic anhydride as for instance dilute acetic acids resulting from the industrial acetylation processes for example such as are obtained in the manufacture of cellulose acetate.

It is also to be understood that I may perform the invention in presence of air, nitrogen or other indifferent gases.

Further according to the present invention, instead of acetic acid, I may subject the vapours of propionic or other homologous aliphatic acids to the process hereinbefore described to obtain the corresponding aliphatic acid anhydrides. In employing such other aliphatic acids I may likewise employ them in the form of dilute or substantially concentrated acids or in any state of concentration.

The accompanying drawing serves to illustrate diagrammatically one form of apparatus for carrying out my invention it being understood that this is given only by way of illustration and is in no way limitative. The figure on the drawing is a diagrammatical view of such apparatus.

Referring to the drawing 1 is the hot reaction zone wherein acetic acid vapor is subjected to the action of heat at a temperature of between 700° and 1000° C., the acid vapor being passed through the zone 1 in a rapid stream. 2 is an absorption vessel containing phenetol, benzyl ether (or other water insoluble solvent for acetic anhydride of higher boiling point than acetic anhydride) maintained at a temperature between the boiling point of water and of acetic anhydride. 3 is a still wherein the solvent from the absorption vessel is heated to distill off the anhydride.

In operation the gases from the reaction pass from the reaction zone 1 via the pipe 1ª into contact with the hot solvent in the absorption vessel 2. The acetic anhydride is largely absorbed from the reaction gases by the hot solvent, whilst the water vapor passes on leaving the vessel 2 by the pipe 2ª. The solvent is caused to pass continuously via the pipe 4 to the still 3 wherein it is heated to distill off the acetic anhydride and is caused to return continuously from the still 3 to the absorption vessel 2 via the pipe 5. The acetic anhydride passing from the still 3 is condensed in any suitable manner.

Having now particularly described and ascertained the nature of my said invention and in what manner the same is to be performed, I declare that what I claim is:—

1. Process for the manufacture of fatty acid anhydrides, comprising decomposing vapours of fatty acids by the action of heat and condensing the anhydride from the reaction vapours at temperatures at which the water remains gaseous.

2. Process for the manufacture of fatty acid anhydrides, comprising decomposing vapours of fatty acids by the action of heat and condensing the anhydride from the reaction vapours by passing them in contact with a liquid of higher boiling point than water and maintained at temperatures at which the water remains gaseous.

3. Process for the manufacture of fatty acid anhydrides, comprising decomposing vapours of fatty acids by the action of heat and condensing the anhydride from the reaction vapours by passing them in contact with a solvent for the anhydride of higher boiling point than water and maintained at temperatures at which the water remains gaseous.

4. Process for the manufacture of acetic anhydride, comprising decomposing vapours of acetic acid by the action of heat and condensing the anhydride from the reaction vapours at temperatures at which the water remains gaseous.

5. Process for the manufacture of acetic anhydride, comprising decomposing vapours of acetic acid by the action of heat and condensing the anhydride from the reaction vapours by passing them in contact with a liquid of higher boiling point than water and maintained at temperatures at which the water remains gaseous.

6. Process for the manufacture of acetic anhydride, comprising decomposing vapours of acetic acid by the action of heat and condensing the anhydride from the reaction vapours by passing them in contact with a solvent for the anhydride of higher boiling point than water and maintained at temperatures at which the water remains gaseous.

7. Process for the manufacture of acetic anhydride, comprising decomposing vapours of acetic acid by the action of heat in presence of catalysts and condensing the anhydride from the reaction vapours at temperatures at which the water remains gaseous.

8. Process for the manufacture of acetic anhydride, comprising decomposing vapours of acetic acid by the action of heat in presence of catalysts and condensing the anhydride from the reaction vapours by passing them in contact with a liquid of higher boiling point than water and maintained at temperatures at which the water remains gaseous.

9. Process for the manufacture of acetic anhydride, comprising decomposing vapours of acetic acid by the action of heat in presence of catalysts and condensing the anhydride from the reaction vapours by passing them in contact with a solvent for the anhydride of higher boiling point than water and maintained at temperatures at which the water remains gaseous.

10. Process for the manufacture of acetic anhydride, comprising decomposing vapours of acetic acid at temperatures from about 700° to 1000° C. and condensing the anhydride from the reaction vapours at temperatures at which the water remains gaseous.

11. Process for the manufacture of acetic anhydride, comprising decomposing vapours of acetic acid at temperatures from about 700° to 1000° C. and condensing the anhydride from the reaction vapours by passing them in contact with a liquid of higher boiling point than water and maintained at temperatures at which the water remains gaseous.

12. Process for the manufacture of acetic anhydride, comprising decomposing vapours of acetic acid at temperatures from about 700° to 1000° C. and condensing the anhydride from the reaction vapours by passing them in contact with a solvent for the anhydride of higher boiling point than water and maintained at temperatures at which the water remains gaseous.

13. Process for the manufacture of acetic anhydride, comprising decomposing vapours of dilute acetic acid by the action of heat and condensing the anhydride from the reaction vapours at temperatures at which the water remains gaseous.

14. Process for the manufacture of acetic anhydride, comprising decomposing vapours of dilute acetic acid by the action of heat and condensing the anhydride by passing the reaction vapours in contact with a solvent for the anhydride of higher boiling point than water and maintained at temperatures at which the water remains gaseous.

15. Process for the manufacture of acetic anhydride, comprising decomposing vapours of acetic acid by the action of heat, condensing the anhydride from the reaction vapours by passing them in contact with a solvent for the anhydride of higher boiling point than water and maintained at temperatures at which the water remains gaseous, conducting the solvent from the absorption zone and separating the anhydride therefrom, and returning the solvent to the absorption zone.

16. Process for the manufacture of acetic anhydride, comprising decomposing vapours of acetic acid by the action of heat, mixing the reaction vapours with vapours of a solvent for the anhydride of higher boiling point than water and condensing the anhydride from the resulting mixture at temperatures at which the water remains gaseous.

17. Process for the manufacture of acetic anhydride, comprising decomposing vapours of acetic acid by the action of heat and condensing the anhydride from the reaction vapours by passing them in contact with a solvent for the anhydride of higher boiling point than the anhydride and maintained at temperatures at which the water remains gaseous.

In testimony whereof I have hereunto subscribed my name.

HENRY DREYFUS.